United States Patent [19]
Gerresheim et al.

[11] 3,982,600
[45] Sept. 28, 1976

[54] VEHICLE ENGINE HOOD

[75] Inventors: Jost Gerresheim, Dusseldorf; Alfons Drennhaus, Hulzbuttgen; Hans Breidenbach, Nievenheim-Delrath; Rodolf Mansour; Christian Pfeil, both of Neuss (Rhine), all of Germany

[73] Assignee: International Harvester Company, Chicago, Ill.

[22] Filed: July 31, 1975

[21] Appl. No.: 600,659

[30] Foreign Application Priority Data
Aug. 7, 1974   Germany .................................. 2437995

[52] U.S. Cl. ............................. 180/69 C; 16/128.1; 180/54 A; 181/33 K
[51] Int. Cl.² ........................................ B62D 25/10
[58] Field of Search ............. 180/54 A, 69 C, 69 R, 180/68 R, 68 P; 181/33 M; 16/128.1; 296/76

[56] References Cited
UNITED STATES PATENTS

| | | | |
|---|---|---|---|
| 3,043,390 | 7/1962 | Lattay | 180/54 A |
| 3,207,250 | 9/1965 | Bamford | 180/54 A X |
| 3,232,368 | 2/1966 | Sullivan | 180/69 C |
| 3,237,790 | 3/1966 | Klampert et al. | 214/132 |
| 3,339,969 | 9/1967 | Bridle et al. | 296/76 |
| 3,428,141 | 2/1969 | Forstner et al. | 180/54 A |
| 3,857,453 | 12/1974 | Buttke et al. | 180/54 A |
| D226,707 | 4/1973 | Skyer et al. | D40/5 R |
| D227,094 | 6/1973 | Skyer et al. | D40/5 B |
| R26,635 | 7/1969 | Klampert et al. | 214/132 |

FOREIGN PATENTS OR APPLICATIONS

| | | | |
|---|---|---|---|
| 741,977 | 12/1932 | France | 180/69 R |
| 1,425,928 | 12/1965 | France | 180/69 C |
| 881,611 | 7/1953 | Germany | 180/54 A |

*Primary Examiner*—M. H. Wood, Jr.
*Assistant Examiner*—Milton L. Smith
*Attorney, Agent, or Firm*—Floyd B. Harman; Raymond E. Parks

[57] ABSTRACT

A hood for a tractor loader vehicle which is provided with baffles and ducts, for changing the direction of air flow through a heat exchanger in order to reduce the level of sound generated by the fan of the vehicle's cooling system.

10 Claims, 4 Drawing Figures

VEHICLE ENGINE HOOD

CROSS REFERENCE TO RELATED APPLICATION

German Patent Application No. P 2336953.7-21; filed by International Harvester Company M.B.H; on July 31, 1974, with WILHELM ROWE and JOST GERRESHEIM named as the inventors. A corresponding U.S. Pat. application was filed on Jul 24, 1975 under Ser. No. 598,606.

BACKGROUND OF THE INVENTION

This invention relates to a motor vehicle having an internal combustion engine and cooling system. In particular, it relates to a hinged engine hood means for encasing both the internal combustion engine and the cooling system.

FIELD OF THE INVENTION

At an increasing rate continuously rising demands are made to achieve a reduced noise emission. On motor vehicles the noise sources chiefly to be considered are the rolling noise produced by the contact between the tires and the road, the engine noise, the noise emitted by the exhaust system, and the carriage noise. Tests proved that in many cases the internal combustion engine is the main source of noise. Every expert knows that any improvement regarding the noise emission first of all requires a reduction of the noise emitted by the main source of noise. Emanating from the internal combustion engine the noise propagate by both, airborne sound and solid-borne sound (mechanical vibration). Four different measures are generally applied to reduce noise: the absorption of airborne sound, the airborne-sound insulation, the insulation of solid-borne sound, and the absorption of solid-borne sound. When insulating airborne sound one endeavours to accoustically separate neighboring compartments by means for separating walls with a high weight per unit area. The aim is to eliminate as much as possible any vibration of the separating wall caused by airborne sound striking said wall, so that one or only a negligible quantity of airborne sound can radiate into the neighboring compartment. The absorption of airborne sound is generally to be understood as a elimination of sound reflection on the smooth walls of the interior chambers. To effect the absorption of airborne sound the application of porous materials is considered a beneficial measure, since in the pores the intermittent motion of the air is suppressed by the friction of the walls of the pores.

In practical application the measures described above are applied individually or in combination more or less successfully. The difficulties encountered can chiefly be traced back to the fact that noise protection measures are not only expensive, but also require a lot of space which is normally non-existent on the machines already existing and is available only to very limited extent on newly developed machines. Furthermore, components required for sound protection measures, e.g. covering panels, etc., must neither obstruct the vision of the operator driving the motor vehicle and thus impair the maneuverability of the vehicle, nor change the contour of the motor vehicle to any considerable extent. Components required for noise reduction must be safeguarded against damage, as much as this is possible. They must meet legal requirements, and they must provide facilities to fit auxiliary equipment as, for example, lighting equipment. Finally, noise reduction measures must not impair the performance of a motor vehicle too much. An example of this is in the case of a complete encasing of an internal combustion engine where an impermissible high localization of heat would develop within the engine compartment.

The invention is based on the realization that adequate noise reduction measures can only be applied if simultaneously the factors influencing the efficiency of the motor vehicle are taken fully into consideration. Based on this assumption, special attention ought to be given to the flow of the incoming and outgoing air for cooling the engine, since a considerable reduction of the sound level can be achieved by an appropriate control of the cooling air flow.

Therefore, the invention is based on the objective to provide a motor vehicle of the initially mentioned type, on which noise reduction measures can be performed by simple means of design, with only negligible interference with the design of the motor vehicle, and with almost complete maintaining of the original drive power (performance).

According to the invention, the above mentioned objective is achieved by designing the engine hood to have the front which faces the cooling system closed and the inner face of the front fitted with guide blades directing the flow of cooling air upwards and along either side of the hood. The inner faces of the lateral walls are equipped with one each coffer-type air duct rising from the bottom section of the cooling system in longitudinal direction of the vehicle towards the internal combustion engine and the top section of the hood is provided with an outlet opening for discharging the spent air. By this forced repeated diverting of the cooling air flow, on the one hand, a muffling of the noise is achieved and, on the other hand, a direct emerging of the sound is prevented. By this measure alone a considerable reduction of the noise level is achieved without having to use any insulating materials. This not only results in a considerable cost reduction, but all other problems normally encountered are eliminated, as for example, loosening and soiling, respectively of the insulating material.

DESCRIPTION OF THE PRIOR ART

Up till now it was generally considered imperative to use insulating materials for noise reduction purposes, e.g. the inner faces of covering panels were lined with insulating materials. Apart from being dependent upon the outside firms supplying the insulating materials, it also came to light that insulating materials not always produce satisfactory results. Furthermore, in most cases only individual panels were fitted with insulating materials. Up till now it was a complicated process to remove such panels from the vehicle, so that essential repair and maintenance work, particularly in the vicinity of the internal combustion engine could be performed only after a complicated removal of the lined panels.

SUMMARY OF THE INVENTION

Contrary to the techniques described above, with this invention the noise reduction is achieved by a hinged engine hood, on which all components are fitted which are required to effect a forced flow of the cooling air with the purpose of achieving a noise reduction. This design presents special advantages. The hinged engine hood, including the components used to guide the air flow, can be assembled apart from the vehicle and the complete engine hood assembly can then be mounted on the vehicle as one complete unit. By arranging the coffer-type air ducts on the inside of the lateral panels of the hood yet another advantage is achieved. The hood is reinforced and thus much more rigid and vibration resistant which again adds to the desired noise reduction. An appropriate design of the invention shows the fan-shaped guide blades in a superposed arrangement, whereby the blades are fitted by means of straps to a plate sealing the front face of the hood. The coffer-type ducts, which are preferably fitted in a detachable manner to the lateral panels of the hood, are fundamentally of triangular shape. Hereby a particularly advantageous forced or guided flow is achieved. Adding to this effect is the fact that the coffer-type ducts are sealed airtight against the interior of the hood by their vertically arranged boundary front edge which, in the vicinity of the cooling system e.g. a water radiator, limits the cooling air inlet port, and by their top edge which, in the vicinity of a horizontally arranged cover plate, limits a cooling air discharge opening.

As regards the airflow another advantageous arrangement is the fitting of vertically standing and slightly inward bent baffle plates above the cover plate on the lateral panels of the hood. These baffle plates direct the spent air above the cover plate to the discharge opening provided in the hood. Based on the air circulation described above, it is also of advantage to provide an exhaust gas sound muffler arranged along the longitudinal direction of the engine hood. At either side of said muffler, trapezoidal or upwardly inclined deflectors of sheet metal or the like are provided to direct the spent air in an even more beneficial manner to the discharge opening which is provided in the vicinity of the exhaust gas sound muffler and is located symmetrically in the hood. This symmeterical arrangement of the discharge opening presents the advantage that the cooling air, which by means of the guide blades has been directed evenly to either side of the hood, is led off completely by this one discharge opening. In the vicinity of the discharge opening the exhaust gases and the spent air are blended.

It has already been explained that owing to limited space conditions it is generally rather difficult to accommodate the noise reduction components required to carry out effective noise protection measures. This applies particularly to the case where the hood is of a hinged design and has been provided with weight compensating equipment. Therefore, weight compensating equipment of very compact design will have to be provided in any case. According to the inventon a torsion-bar spring device is provided as a weight compensating device for the hinged hood.

In a preferred embodiment the torsion-bar spring unit consists of two parallel arranged torsion bars with the opposite ends of each bent at a right angle. One of the ends of each torsion bar is designed as a mounting member arranged parallel to the longitudinal axis of the vehicle, the other end of each torsion bar is designed as holding member guided in a longitudinal slot in the hood.

There is a tractor loader type of vehicle which has a chassis, an engine carried on the chassis, an engine cooling system including a fan creating air flow longitudinally across the engine and blowing it through a heat exchanger carried on the chassis, an exhaust gas muffler connected to the engine and a hood encasing the engine and cooling system including a grille mounted the hood downwind of the heat exchange. In accordance with the preferred embodiment of this invention there is provided a plate means between the heat exchanger and the grille for sealing the grille. There is an air guide means on the plate means downwind of the heat exchanger for dividing the air flow from the heat exchanger into a plurality of air streams. Some of the air streams flow upwardly and some flow laterally and then in a reverse direction to the air flow. The air guide means also include an additional air guide means for directing the upwardly directed air streams in a reverse direction towards the top center of the engine. There is a coffer-type of duct means on the inner lateral walls of the hood for receiving the reversed lateral air streams and directing said air streams upwardly towards the top center of the engine. The hood has an open section above the top center of the engine for discharging the streams of air collected at said top center of the engine. There is a second plate means between the open section in the hood and the top of the engine for sealing the top center of the engine from the air flow longitudinally across the engine. Finally, there is a hinge means for tilting the hood away from the engine for gaining access thereto.

BRIEF DESCRIPTION OF THE DRAWING

A preferred embodiment according to the invention is pictured in the various figures of the drawing and is presented in detail as follows.

DESCRIPTION OF THE PREFERRED EMBODIMENT

Figure 1:
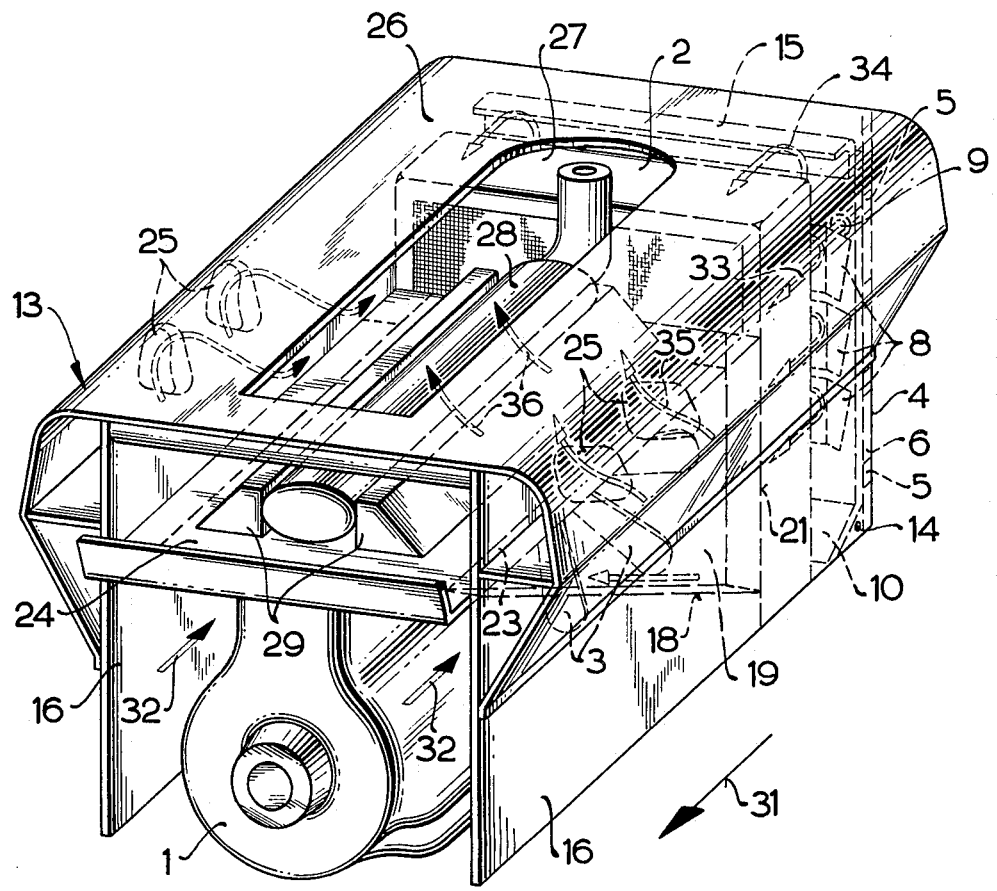
FIG. 1 illustrates a portion of a motor vehicle, as for example, a tractor loader, with the noise protection measures applied in the hood in accordance with the invention.

The partial motor vehicle shown in the FIGS. 1 through 4 is a tractor loader type of vehicle, such as shown in U.S. Pat. No. 3,237,790 (Re. 26,635) Kampert et al.-Mar. 1, 1966 and in U.S. Pat. No. D226,707 Skyer-Apr. 17, 1973. There is a internal combustion engine 1 with a cooling system comprising a water radiator 2 and a fan 3. At the rear of the loader, a grille frame 4 is arranged. The grille is of standard design such as shown in U.S. Pat. No. D227,094 Skyer et al.-June 5, 1973, with openings or slots 6 between the grille bars 5. According to the invention these slots are sealed by a plate 7.

Figure 3:
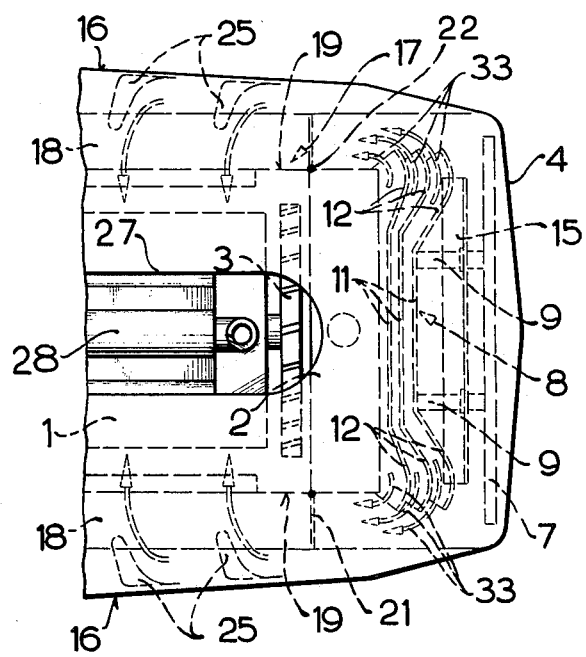
FIG. 3 illustrates a portion of the top view of the vehicle shown in FIG. 1.

In the area between the plate 7 and the water radiator 2, several guide blades 8 are arranged in fan-like manner above each other. They are mounted on the plate 7 by means of bars or stems 9 of decreasing length as the elevation of the guide blades 8 increases. FIG. 3 shows that the fan-shaped guide blades 8 have a flat center section 11 and adjoining bent or curved distal end sections 12. The front face of the grille 4 is part of a hood 13 encasing the engine 1 and the cooling equipment 2 and 3. The hood 13 is supported in a tiltable manner by means of a bottom hinge 14. The hinge 14 is located at an inclined inner wall 10. There is provided above the top guide blade 8, an additional guide blade 15 which is bent at a right angle and is fitted inside the hood 13. On the inner faces of the lateral walls or panels 16 of the hood 13 coffer-type ducts 17 are fitted in a detachable manner. The ducts 17 mainly consist of an upwardly sloped bottom face 18 rising from the bottom of the water radiator 2 in a longitudinal directon of the vehicle, and one each boundary wall 19 running at a distance parallel to the lateral panels 16 of the hood 13.

The coffer-type ducts 17 are of triangular design, and, in the vicinity of the water radiator, have vertically extending leading edges 21 sealed airtight against the radiator by means of sealing strips 22. In a similar manner a top edge 23 of the coffer-type ducts 17 is sealed airtight against a horizontally arranged cover plate 24. This way an inlet opening for cooling air is formed in the vicinity of the vertical front edges 21 and an outlet opening is formed in the vicinity of the top edges 24 of the coffer-type ducts 17.

Above the cover plate 24, on the plane of the air ducts 17, verticaly arranged slightly inward bent baffle plates 25 are fitted to the inner faces of the lateral panels 16 of the hood 13. An outlet opening 27 is provided symmetrically at the center of the top face 26 of the hood 13. Underneath the outlet and above the cover plate 24 an exhaust gas sound muffler 28 is provided. At the lateral longitudinaly extending sides of the exhaust gas sound muffler 28 a pair of trapezodial or upward sloped guide sheets 29 are fitted. Since the vehicle on which the invention is incorporated is a loader, the front face of the grille 4 is located at the rear of the vehicle, with respect to the forward direction of travel of the vehicle as it moves in direction of the arrow 31.

Figure 2:
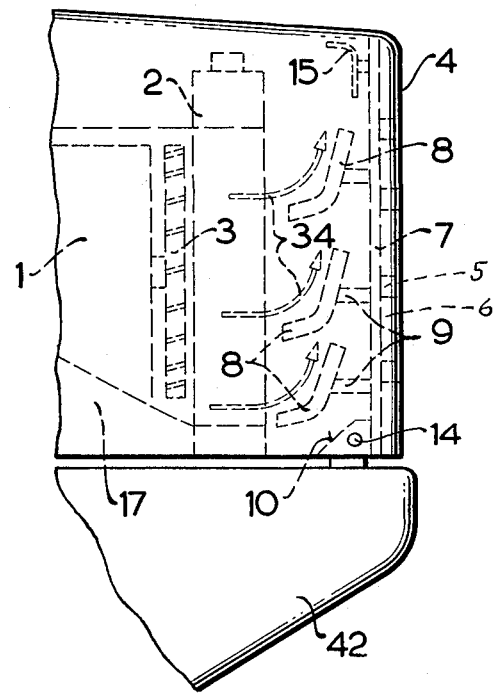
FIG. 2 illustrates a portion of a lateral view of the vehicle shown in FIG. 1.
Figure 4:
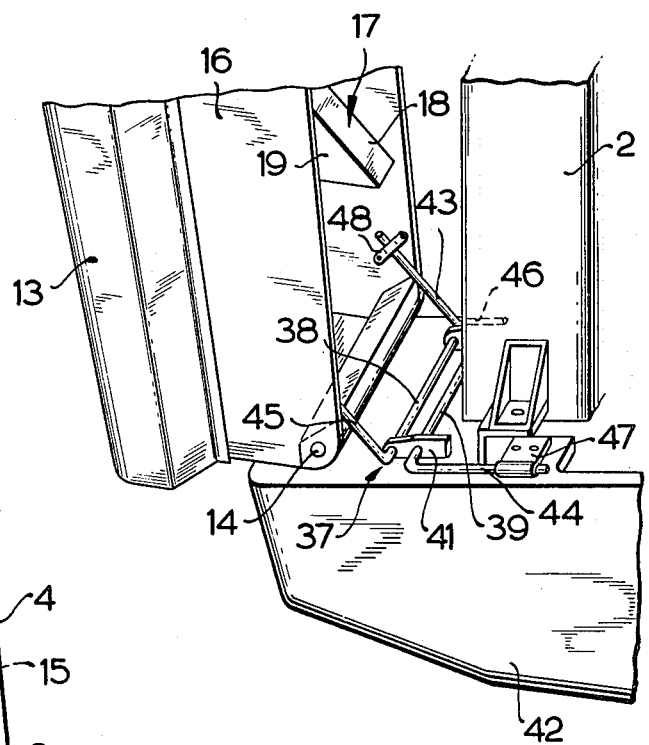
FIG. 4 illustrates a portion of the loader featuring the weight compensating feature of the hinged hood.

During forward travel operation of the vehicle, the cooling air flows in a rearward direction, as shown by the twin arrows 32 in FIG. 1, along the lateral longitudinally extending sides of the internal combustion engine 1 and passes the interior of the hood 13. After passing the fan 3 and the water radiator 2 the air emerges again at that side of the water radiator facing the fan-shaped guide blades 8, so that the cooling air hits the flat section 11 of the guide blades 8 and is redirected along both sides of the sections, as shown by the arrows 33 (FIGS. 1 and 3), and in upward direction as shown by the other arrows 34 (FIGS. 1 and 2). Thereafter the laterally redirected cooling air enters the coffer-type air ducts 17 by way of the inlet openings, from which it emerges again by the outlets after having taken an upward sloped path. The air then flows above the cover plate 24, as shown by arrows 35 (FIG. 1), and along the guide panels 29 as shown by arrows 36 (FIG. 1), and emerges from the discharge opening 27 provided in the top sheet 26 of the hood 13. As already explained, the hinge 14 allows the hood 13 to be tilted rearward as shown in detail in FIG. 4. Even though the hood 13 has been equipped with air ducts there must still be adequate room for a weight compensating device 37. A compact weight compensating device can be obtained by use of a torsion-bar spring. According to the invention the torsion-bar spring consists of two torsion bars 38,39 arranged in parallel annd running transverse to the longitudinal direction of the vehicle. The bars 38,39 are supported by means of shackles 41 provided on a chassis frame 42 of the vehicle which is not shown in detail. The distal ends of the torsion-bars 38,39 are bent at a right angle forming arms 43, 44,45 and 46 of a Z-shaped member. The one arm 44,46 of each torsion-bar 38,39 is designed as a mounting member and for this purpose is mounted on the chassis frame 42 by means of shackles 47. The other arm 43,45 is designed in form of a holding member and, for this purpose is guided in a longitudinal shackle-type slot 48 provided in the hood 13.

It is to be understood that the invention is not limited to the embodiments shown, but allows variations within the scope of the claims. For example, it is possible to additionally fit the individual components and fairing parts of the hood with insulating material, if this should become necessary in certain cases. Furthermore, the air flow can be directed in the opposite direction.

The embodiments of the invention in which an exclusive property or priviledge is claimed are defined as follows:

1. In a tractor loader type of vehicle having a chassis, an engine carried on the chassis, an engine cooling system including a fan creating an air flow longitudinally across the engine and blowing it through a heat exchanger carried on the chassis, an exhaust gas muffler connected to the engine, and a hood encasing the engine and cooling system including a grille mounted to the hood downwind of the heat exchanger, wherein the improvement comprises:
   a plate means between the heat exchanger and the grille for sealing the grille;
   air guide means on the plate means downwind of the heat exchanger for dividing the air flow from the heat exchanger into a plurality of air streams some flowing upwardly and some flowing laterally and then in a reverse direction to the air flow, the air guide means including an additional air guide means for directing the upwardly directed air streams in a reverse direction towards the top center of the engine;
   coffer-type duct means on the inner walls of the hood for receiving the reversed lateral air streams and directing said air streams upwardly towards the top center of the engine;
   the hood having an open section above the top center of the engine for discharging the streams of air collected at said top center of the engine;
   a second plate means between the open section in the hood and the top of the engine for sealing top center of the engine from the air flow longitudinally across the engine; and
   hinge means for tilting the hood away from the engine for gaining access thereto.

2. The invention according to claim 1, wherein the air guide means comprise a plurality of elongated blades extending across the width of the heat exchanger and rising above one another along the height of said heat exchanger, the blades each having a center section extending parallel to the plate means and merging into arches at the distal ends thereof which curve toward the duct means, the center section having a curved lower portion forming an air scoop facing the air flow through the heat excahnger; and wherein
   the additional air guide means comprises an elongate bar following the uppermost blade curved to form an air scoop facing the upwardly air stream and the top of the heat exchanger.

3. The invention according to claim 2, wherein the blades are mounted on bars projecting from the plate means, the bars decreasing in length as the elevation of the blades increases arranging the blades in a fan-like manner.

4. The invention according to claim 3, wherein the elongate bar is curved at a right angle.

5. The invention according to claim 1, wherein the duct means are each triangular in shape and are each detachably mounted to the lateral walls of the hood, and one side of each triangular configuration extending vertically parallel with a respective side of the heat exchanger and forming an opening therewith for receiving the reversed lateral sir streams.

6. The invention according to claim 5, wherein sealing means are provided between the one side of the duct means and the respective side of the heat exchanger for sealing the reversed lateral air streams opening from the air flow longitudinally across the engine.

7. The invention according to claim 5, wherein a second side of each triangular configuration extends parallel with a respective side of the second plate means and forms an opening therewith to the top center of the engine, and further including a plurality of baffle plates mounted to the inner lateral walls of the hood above said opening and being bent to form air deflector means for directing the reversed lateral air streams into the area above the second plate means.

8. The invention according to claim 1, wherein the hinge means comprises a sloped laterally extending wall at the bottom of the plate means forming a seal means for preventing the plurality of air streams from escaping under the bottom edge of the hood, and said wall at the distal ends thereof being pin connected to the chassis.

9. The invention according to claim 8, wherein the hinge means further include two torsion bars of a Z shape, the body of each Z extending laterally and being journally mounted to the chassis, one leg of each Z respectively being slidably mounted to the inner lateral walls of the hood in the vicinity of the pin connections of the sloped wall, and the second leg of each Z being fixed to the chassis in the vicinity of the heat exchanger.

10. The invention according to claim 1, wherein the exhaust muffler extends longitudinally below the open section in the hood, and the second plate means is provided with upwardly sloped baffle plates which nest the exhaust muffler.

* * * * *